United States Patent
Atawia

(10) Patent No.: US 12,267,719 B2
(45) Date of Patent: Apr. 1, 2025

(54) LOCATION SELECTION FOR DISAGGREGATED RADIO ACCESS NETWORK FUNCTIONS

(71) Applicant: Dell Products, L.P., Round Rock, TX (US)

(72) Inventor: Ramy Atawia, Kanata (CA)

(73) Assignee: DELL PRODUCTS, L.P., Round Rock, TX (US)

( * ) Notice: Subject to any disclaimer, the term of this patent is extended or adjusted under 35 U.S.C. 154(b) by 418 days.

(21) Appl. No.: 17/811,194

(22) Filed: Jul. 7, 2022

(65) Prior Publication Data
US 2024/0015561 A1    Jan. 11, 2024

(51) Int. Cl.
*H04W 28/02* (2009.01)
*H04W 28/08* (2023.01)
*H04W 28/082* (2023.01)

(52) U.S. Cl.
CPC ..... *H04W 28/0236* (2013.01); *H04W 28/082* (2023.05); *H04W 28/0831* (2020.05); *H04W 28/0975* (2020.05)

(58) Field of Classification Search
CPC ......... H04W 28/0236; H04W 28/0831; H04W 28/0975; H04W 28/082
See application file for complete search history.

(56) References Cited

U.S. PATENT DOCUMENTS

| | | | |
|---|---|---|---|
| 2014/0357281 A1* | 12/2014 | Selim | H04W 16/18 455/446 |
| 2020/0195521 A1* | 6/2020 | Bogineni | H04W 36/26 |
| 2020/0267576 A1* | 8/2020 | Bedekar | G06F 9/5077 |
| 2021/0400556 A1* | 12/2021 | Maattanen | H04W 36/324 |
| 2023/0129344 A1* | 4/2023 | Mueller | H04B 7/0691 455/450 |
| 2023/0363028 A1* | 11/2023 | Da Silva | H04W 76/15 |

OTHER PUBLICATIONS

Pamuklu et al., "Energy-Efficient and Delay-Guaranteed Joint Resource Allocation and DU Selection in O-RAN," arXiv:2110.00035v2 [cs.NI] Jan. 29, 2022, 6 pages.
Mollahasani et al., "Dynamic CU-DU Selection for Resource Allocation in O-RAN Using Actor-Critic Learning," arXiv:2110.00492v1 [cs.NI] Oct. 1, 2021, 6 pages.

* cited by examiner

*Primary Examiner* — Won Tae C Kim
(74) *Attorney, Agent, or Firm* — Amin, Turocy & Watson, LLP

(57) ABSTRACT

The described technology is generally directed towards location selection for disaggregated radio access network (RAN) network functions. Disaggregated RAN network functions include, for example, RAN distributed units (DUs) and RAN central units (CUs) that are associated with RAN cells and RAN radio units (RUs). When multiple viable equipment locations are available, of equipment that can host DUs and/or CUs, the disclosed techniques can be used to select preferred location(s). The DU(s) and/or the CU(s) can be moved to equipment at the selected location(s) to improve network performance. Disclosed techniques can account for inter-cell delay requirements of different RAN cells, to place network functions in a manner that supports effective coordination between multiple cells.

20 Claims, 10 Drawing Sheets

LOCATION SELECTION FOR DISAGGREGATED RADIO ACCESS NETWORK FUNCTIONS

TECHNICAL FIELD

The subject application generally relates to cellular networks, for example, to location selection for radio access network components of cellular networks, and related embodiments.

BACKGROUND

Radio access networks (RANs) provide wide-area wireless connectivity to mobile devices. Functions of RANs include, e.g., converting internet protocol (IP) packets to physical layer packets, and vice versa, in order to transmit and receive data over wireless channels, as well as conducting radio resource management (RRM) to manage the radio resources used to communicate with mobile devices.

The third generation partnership project (3GPP) has designed a RAN protocol stack that includes, e.g., radio resource control (RRC), packet data convergence control via the packet data convergence protocol (PDCP), radio link control (RLC), a medium access layer (MAC), and a physical layer (PHY).

Fifth generation (5G) cellular networks "disaggregate" the RAN by splitting the RAN protocol stack into independent components. Disaggregation is expected to reduce energy consumption, improve system performance, and allow for rapid, open innovation in different components while ensuring multi-vendor operability.

The disaggregated RAN architecture includes central units (CUs), distributed units (DUs), and radio units (RUs). In general, CUs centralize RAN packet processing functions, DUs conduct baseband processing functions across cell sites, and RUs include radio functions at antenna sites. While the RUs are located at antenna sites, the locations of CUs and DUs are not fixed to any particular geographic area or site. For example, CUs and DUs can be located "in the cloud," such as at a data center which may or may not be proximal to the RU.

The ability to choose locations for CUs and DUs raises a question of where CUs and DUs should be located for particular RAN deployments. One simple solution would be to locate CUs and DUs at a cheapest location, e.g., at a data center that can host CUs and/or DUs at minimal cost. However, more sophisticated solutions are desired that can account for a variety of considerations and competing priorities that arise in connection with CU and DU location selection.

The above-described background is merely intended to provide a contextual overview of some current issues and is not intended to be exhaustive. Other contextual information may become further apparent upon review of the following detailed description.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
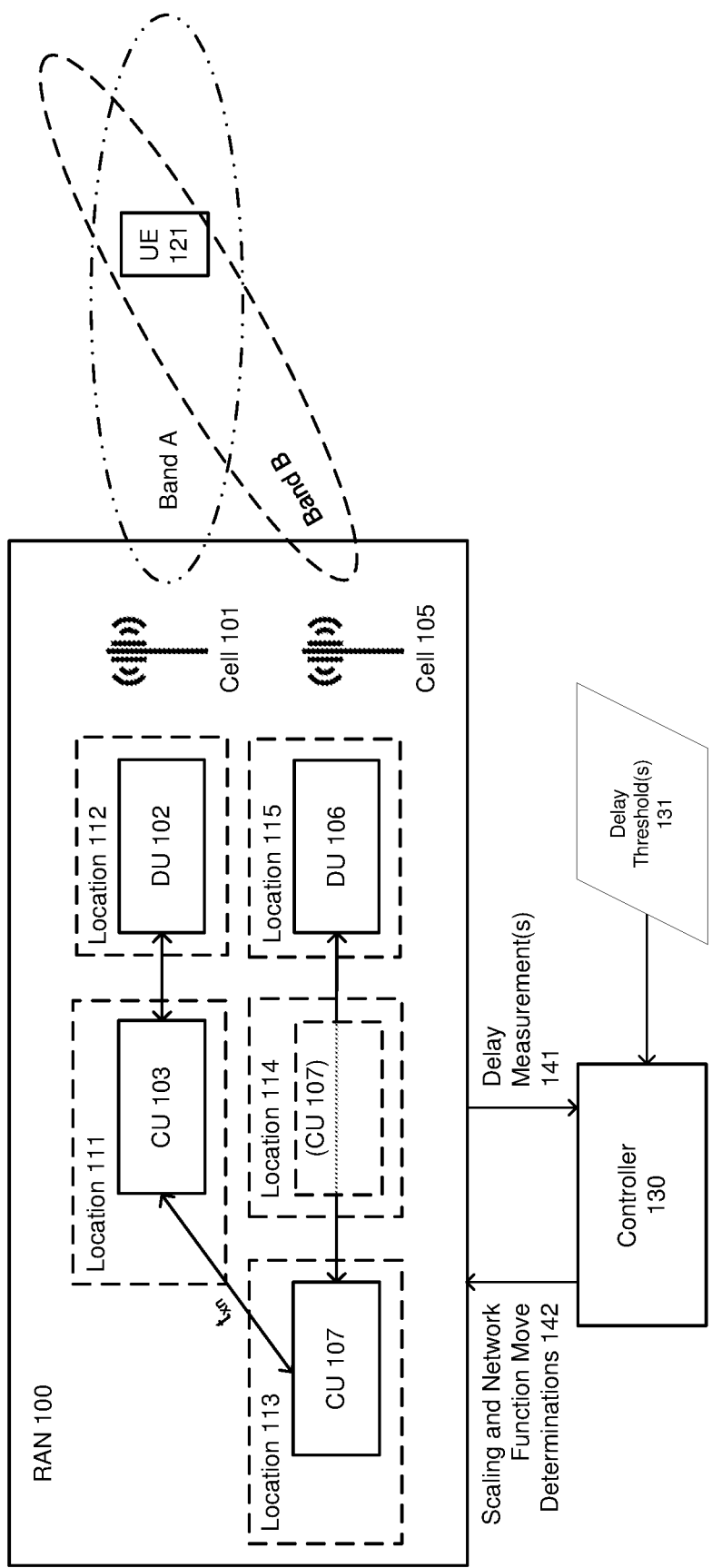
FIG. 1 is a diagram illustrating example radio access network (RAN) network functions at different locations, and a controller adapted to make placement determinations in order to move the network functions among the different locations, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Example embodiments are directed towards location selection for disaggregated radio access network (RAN) network functions. Disaggregated RAN network functions include, for example, RAN distributed units (DUs) and RAN central units (CUs) that are associated with RAN cells and RAN radio units (RUs). When multiple viable equipment locations are available, of equipment that can host DUs and/or CUs, the disclosed techniques can be used to select preferred location(s) to improve network performance. The DU(s) and/or the CU(s) can be moved to equipment at the selected location(s). Disclosed techniques can account for inter-cell delay requirements of different RAN cells, to place network functions in a manner that supports effective coordination between multiple cells. Further aspects and embodiments of this disclosure are described in detail below.

FIG. 1 is a diagram illustrating example RAN network functions at different locations, and a controller adapted to make placement determinations in order to move the network functions among the different locations, in accordance with one or more embodiments described herein. FIG. 1 includes RAN 100, controller 130, and user equipment (UE) 121. The RAN 100 comprises example cells 101 and 105. The cells 101, 105 provide wireless service to the UE 121. Cell 101 communicates with UE 121 using Band A, and cell 105 communicates with UE 121 using Band B. In the illustrated embodiment, the cells 101, 105 can simultaneously provide wireless service to the UE 121. The cells 101, 105 can for example provide dual connectivity for the UE 121, wherein one of the cells, e.g., cell 101 provides fifth generation (5G) wireless service, and the other cell, e.g., cell 105 provides fourth generation (4G) wireless service.

The RAN 100 further comprises example network functions at various different locations. The illustrated network functions include DU 102 and CU 103, which are network functions associated with cell 101. The illustrated network functions further include DU 106 and CU 107, which are network functions associated with cell 105. Radio units (RUs) are not illustrated in FIG. 1, however it can be appreciated that cells 101 and 105 can each comprise an RU.

The RAN 100 is a disaggregated RAN, in which DU 102, CU 103, DU 106 and CU 107 can be implemented at different locations. The example locations in FIG. 1 include locations 111, 112, 113, 114, and 115. The locations 111, 112, 113, 114, and 115 can comprise, e.g., different geographic locations equipped with computing hardware capable of hosting DUs and CUs. For example, the locations 111, 112, 113, 114, and 115 can comprise different data center facilities, or other "cloud" locations comprising computing hardware. In FIG. 1, the DU 102 is illustrated at location 112, the CU 103 is illustrated at location 111, the DU 106 is illustrated at location 115, and the CU 107 is illustrated at location 113. Location 114 is an additional location, and any of the network functions, e.g., CU 107 or other network functions, can be moved into location 114 pursuant to a decision made at the controller 130, as described herein.

The RAN 100 may exhibit various types of delay. Inter-cell delay can comprise delays in communications between different cells or between disaggregated components of different cells. For example, CUs 103 and 107 can be connected by an "Xn" type interface, and communications between CUs 103 and 107 via the Xn interface can take an amount of time denoted as $t_{xn}$. The time $t_{xn}$ is an example of inter-cell delay. Delay can also be intra-cell, e.g., delay that exists between the disaggregated components of a single cell. For example, communications from CU 103 to DU 102, and from DU 102 to the RU at cell 101, can be subject to intra-cell delay. Similarly, communications from CU 107 to DU 106, and from DU 106 to the RU at cell 105, can also be subject to intra-cell delay.

The controller 130 can be configured to collect delay measurements 141 from the RAN 100. The delay measurements 141 can comprise any delay measurements, whether inter-cell, intra-cell, or both. The controller 130 can also receive delay thresholds 131, e.g., delay thresholds 131 can be configured by a network operator. If any of the delay measurements 141 exceed a corresponding delay threshold from delay thresholds 131, then the controller 130 can be configured to responsively reconfigure the RAN 100 in a manner that addresses the unacceptable delay.

For example, in some embodiments, the controller 130 can determine whether moving a network function to a different location will address an excessive delay. If so, the controller 130 can facilitate moving the network function to the different location. For example, when $t_{xn}$ exceeds a delay threshold from delay thresholds 131, the controller 130 can determine whether moving CU 107 to location 114 will reduce $t_{xn}$, without undue negative impact on other delay in the RAN 100. If moving CU 107 to location 114 will lead to a delay reduction, then scaling and network function move determinations 142 can comprise a decision/determination to move CU 107 to location 114. The RAN 100 can be configured to implement the scaling and network function move determinations 142, causing a move of CU 107 to location 114 and thereby addressing the unacceptable $t_{xn}$ delay.

In some embodiments, instead of moving a network function, or in addition to moving a network function, the controller 130 can be configured to determine whether scaling resources applied to a network function will address excessive delay as measured in delay measurements 141. For example, additional computing resources applied to CU 103 at location 111 may address the $t_{xn}$ delay which exceeds a delay threshold from delay thresholds 131. Scaling and network function move determinations 142 can comprise a decision/determination to scale up, i.e., to increase, the memory, processing power, or other computing resources applied to CU 103 at location 111, thereby addressing the excessive delay without necessarily also moving network functions to different locations.

In some embodiments, the controller 130 can be configured to monitor delay measurements 141 on an ongoing basis, e.g., continuously, or periodically at intervals, or aperiodically in response to triggering events. The controller 130 can move network functions between different locations and/or adjust resources applied to network functions at locations 111, 112, 113, 114, and 115 in order to keep the delay measurements 141 within the delay thresholds 131, while also optionally reducing/minimizing resource use at locations 111, 112, 113, 114, and 115 in order to reduce RAN 100 operating costs or release resources for use by other network functions.

In some embodiments, methods disclosed herein can be configured to find the optimal placement of geographically distributed open RAN (O-RAN) network functions, such as O-DU and O-CU, on cloud resources based on inter-cell delay requirements and thresholds. Methods can ensure that multi-cell network functions are placed close enough to one another to support timing thresholds for coordination between multiple cells serving a same UE. The disclosed methods can attain spectral efficiency and throughput gains for inter-cell coordination features such as dual connectivity, carrier aggregation and inter-cell interference. Methods can furthermore conduct real-time monitoring of inter-cell link delays and can continuously optimize the placement of network functions on cloud resources. Methods can furthermore scale cloud resources allocated to network functions.

In O-RAN deployments, network operators may aim to place network functions such as CUs and DUs as far as possible from the edge (e.g., the RUs and the UE), in order to maximize network function pooling gains and decrease deployment costs. On the other hand, realistic network deployments may have mixed traffic types with different performance requirements/thresholds, such as bounded packet delay thresholds. These thresholds can define an upper bound on the maximum tolerable delay between a CU, a DU and an RU of a same cell, resulting in moving DUs and CUs closer to the edge, and correspondingly higher costs.

A network function placement problem can consider the above trade-off between performance and cost while deciding on the location of cloud resources to host network functions. The network function placement problem can furthermore consider amounts of cloud resources reserved for different network functions.

O-RAN specifications use end-to-end delay as a metric for placing RAN network functions on an O-RAN cloud (O-cloud). This metric is represented as the delay between a CU, a DU and an RU of a same cell. Accordingly, for cells serving ultra-reliable low latency communication (URLLC) users, CUs and DUs are generally deployed closer to the edge. For cells serving mobile broadband (MBB) traffic, CUs and DUs can be farther from the edge to enable resource sharing across multiple cells through pooling.

Such placement as per the O-RAN specifications, however, is suboptimal in some circumstances, e.g., for users connected to two cells simultaneously. For instance, with reference to FIG. 1, the UE 121 may connect to RAN 100 via dual connectivity by connecting to cell 101 and cell 105 simultaneously. An Xn interface (connecting CUs 103 and 107) can experience a large delay as depicted in FIG. 1. As a result, data served by cell 101 can have a small CU 103 to DU 102 to RU (at cell 101) delay, and such data may arrive at the UE 121 from cell 101 at much faster pace compared to data from cell 105, which may have a larger CU 107 to DU 106 to RU (at cell 105) delay. Such scenarios can cause data skewing that can increase radio link control (RLC) reordering and can reduce spectral efficiency.

Methods according to some embodiments of this disclosure can deploy network functions such as DUs and CUs on O-cloud resources based in part on inter-cell delay requirements and thresholds. Inter-cell delay thresholds can be specified, e.g., among delay thresholds 131, for various different 3 GPP defined features, such as dual connectivity (DC) and carrier aggregation (CA), or for proprietary features such as inter-cell interference cancellation. Using the inter-cell delay thresholds 131, methods according to this disclosure can propose candidate locations from among locations 111, 112, 113, 114 and 115 for network functions such as CUs 103, 107 and DUs 102, 106 in a pre-deployment phase. Methods can further place/move the network functions 102, 103, 106, and 107 to selected candidate locations from among locations 111, 112, 113, 114 and 115 in a deployment phase. Methods can also scale cloud resources applied to network functions 102, 103, 106, and 107 during network runtime, in a post-deployment phase, based on inter-cell delay measurements 141.

A controller 130 can be configured to collect the inter-cell delay measurements 141 and processing requirements. The controller 130 can change location placements of deployed network functions, such as CU 107, on cloud resources to meet target key performance indicators, e.g., delay thresholds 131, specified by the network operator.

Figure 2:
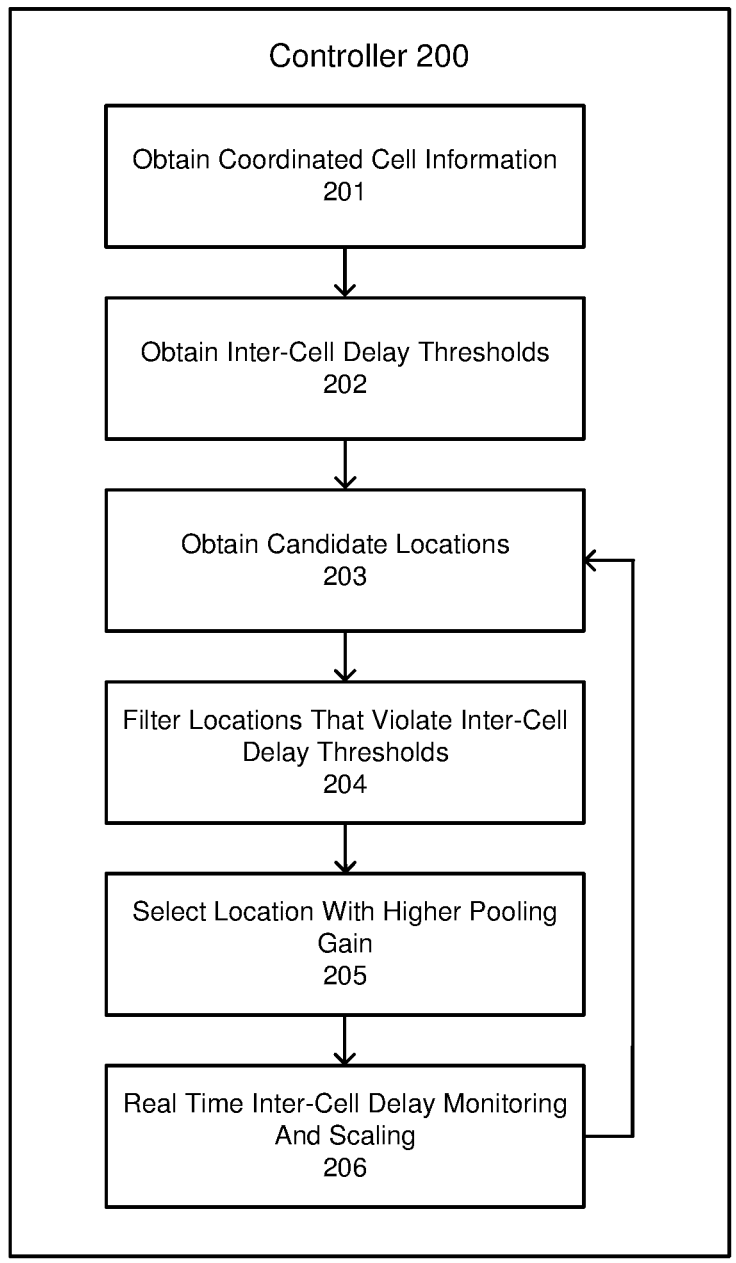
FIG. 2 illustrates an example controller which can implement the controller introduced in FIG. 1, in accordance with one or more embodiments described herein.

FIG. 2 illustrates an example controller which can implement the controller introduced in FIG. 1, in accordance with one or more embodiments described herein. The controller 200 includes elements which can comprise functional components of the controller 200, or operations performed by the controller 200. The elements of controller 200 include: obtain coordinated cell information 201, obtain inter-cell delay thresholds 202, obtain candidate locations 203, filter locations that violate inter-cell delay thresholds 204, select location with higher pooling gain 205, and real time inter-cell delay monitoring and scaling 206.

At obtain coordinated cell information 201, the controller 200 can obtain cell identifiers of coordinating cells, e.g., cells 101, 105, which might simultaneously serve a same UE 121 through a 3 GPP defined RAN feature. The cells 101, 105 can comprise, for example, cells that can serve in a master cell group (MCG) and a secondary cell group (SCG) in connection with a dual connectivity configuration. In some embodiments, coordinating cells 101, 105 can comprise cells associated with proximal RU locations of the cells 101, 105, e.g., cells that are within a distance less than or equal to a distance criterion, as decided during a network planning phase to satisfy coverage requirements.

At obtain inter-cell delay thresholds 202, the controller 200 can be configured to collect inter-cell delay thresholds 131 for each link between network functions of the cells 101, 105. For example, an inter-cell delay threshold for an Xn interface delay (between CUs 103 and 107) and an inter-cell delay threshold for the interface between DUs 102, 106 can be collected. These delay threshold values can be, e.g. provided by the network operator or by a network function vendor.

At obtain candidate locations 203, the controller 200 can be configured to identify and store candidate O-cloud locations, such as locations 111, 112, 113, 114, and 115, which are candidates for hosting the network functions 102, 103, 106, 107. The controller 200 can be configured to collect candidate O-cloud locations for each network function 102, 103, 106, and 107. In some embodiments, candidate O-cloud locations for each network function 102, 103, 106, and 107 can be received as a manual input from a network operator. In some embodiments, candidate O-cloud locations 111, 112, 113, 114, and 115 can be identified, e.g., by being within a defined proximity to the cells 101, 105. For each candidate location 111, 112, 113, 114, and 115 or set of candidate locations, the expected inter-cell delay between network functions, e.g., between CUs 103, 107 and between DUs 102, 106 can be estimated and stored. Furthermore, intra-cell delays between CUs, DUs, and RUs of each cell 101, 105 can be estimated and stored, for each candidate location 111, 112, 113, 114, and 115 or set of candidate locations.

At filter locations that violate inter-cell delay thresholds 204, the controller 200 can be configured to filter O-cloud locations 111, 112, 113, 114, and 115 whose estimated delay from operation 203 can violate an inter-cell delay threshold from operation 202. Filtering O-cloud locations can comprise removing O-cloud locations from the list of candidate locations 111, 112, 113, 114, and 115, resulting in a list of acceptable candidate locations, wherein the acceptable candidate locations are the locations associated with delays that do not violate the inter-cell delay thresholds 131.

At select location with higher pooling gain 205, in case of multiple acceptable candidate locations after delay-based filtering at operation 204, the controller 200 can be configured to select a final location for a network function, e.g., for CU 107, by selecting an acceptable candidate location that satisfies inter-cell delay thresholds for a relatively higher number of cells relative to other acceptable candidate locations, in order to maximize the pooling gains by placing more network functions in a single location.

At real time inter-cell delay monitoring and scaling 206, the controller 200 can be configured to monitor time-varying inter-network function link delays, and the controller 200 can be configured to replace or scale the cloud resources applied to a network function if its inter-cell delay threshold is violated.

Figure 3:
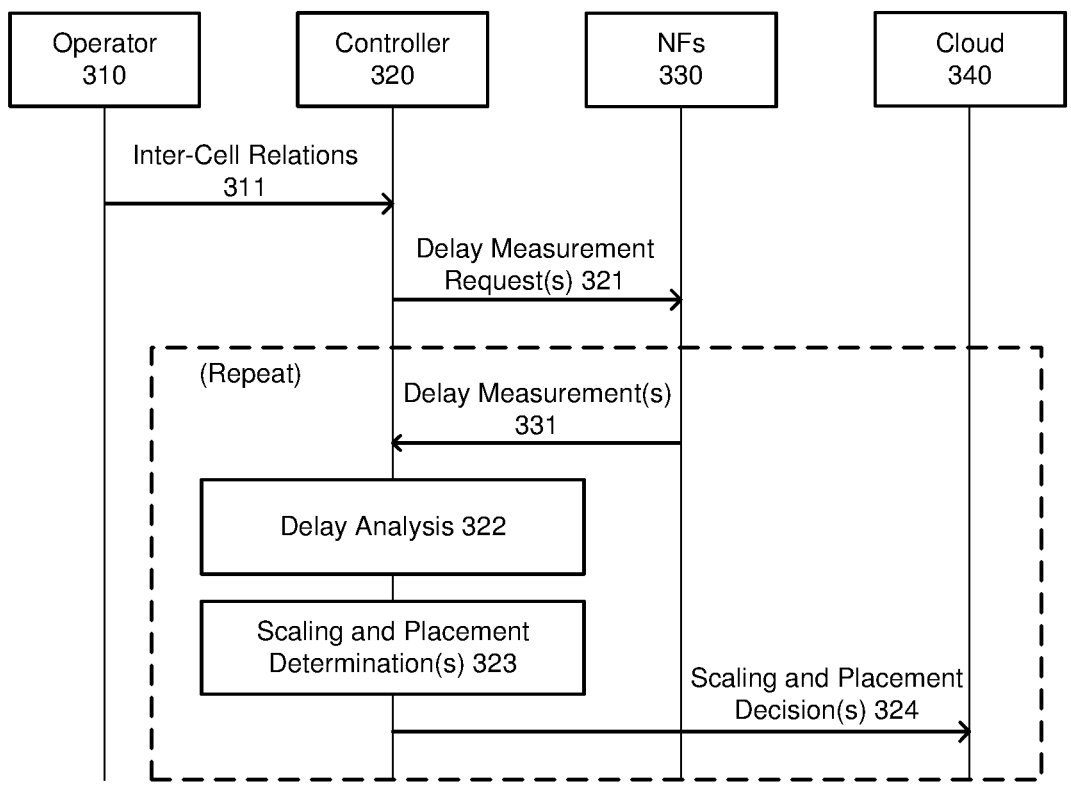
FIG. 3 illustrates example interactions between an operator, a controller, network functions, and a cloud comprising different locations for the network functions, in accordance with one or more embodiments described herein.

FIG. 3 illustrates example interactions between an operator, a controller, network functions, and a cloud comprising different locations for the network functions, in accordance with one or more embodiments described herein. FIG. 3 includes operator 310, controller 320, network functions (NFs), and cloud 340. The controller 320 can implement, e.g. the controller 200 illustrated in FIG. 2, or the controller 130 illustrated in FIG. 1.

Figure 4:
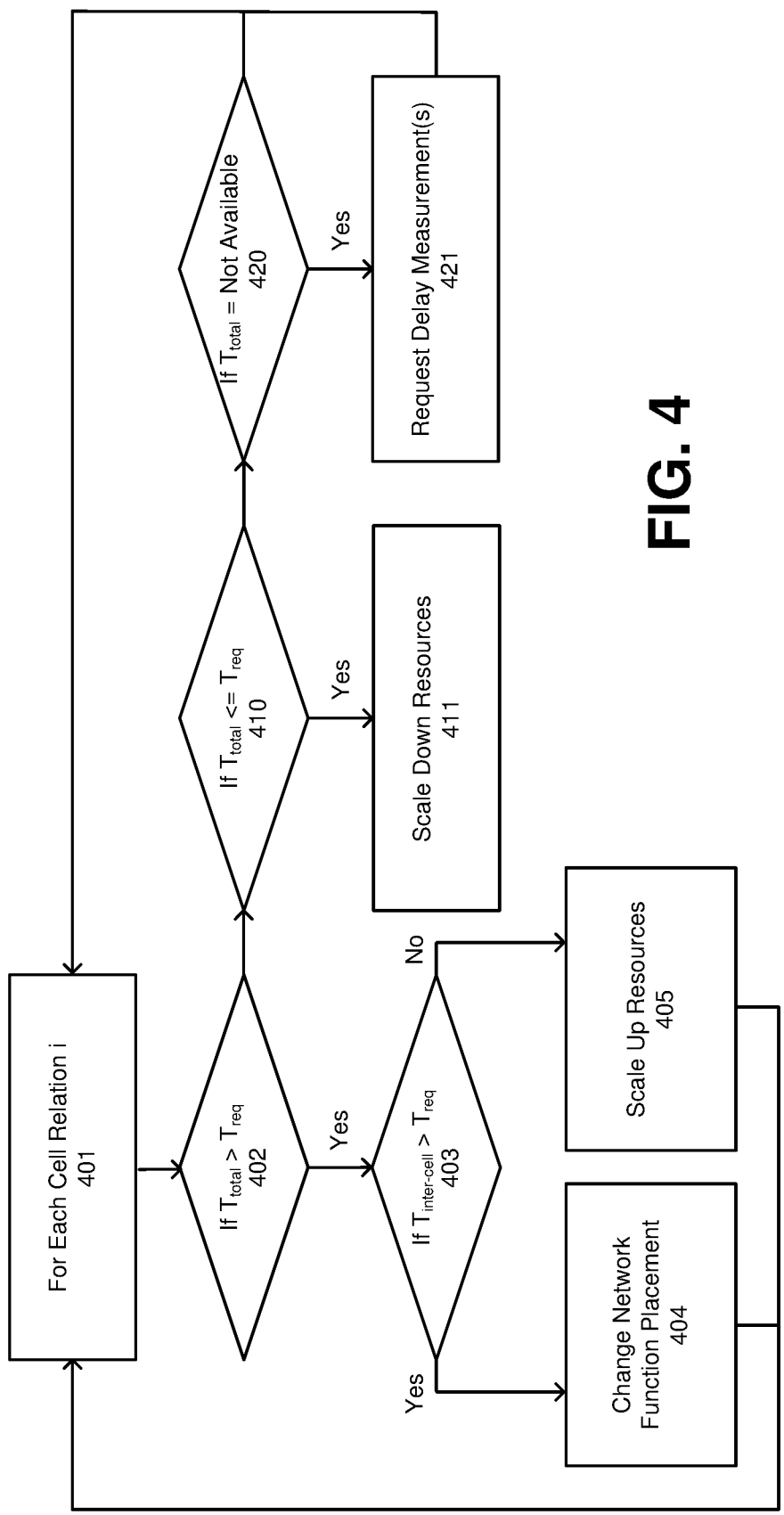
FIG. 4 is a diagram illustrating example operations that can be performed by a controller in connection with analyzing delay measurement data, in accordance with one or more embodiments described herein.

An example precondition for operations according to FIG. 4 can provide that a network is operational and inter-cell relations are defined and used by capable UEs. In an overview of the illustrated operations, the controller 320 can request measured inter-CU delay and inter-DU delay, and the controller 320 can compare delay measurements against the delay thresholds for an activated inter-cell feature (e.g., for dual connectivity). Network function O-cloud resources can be either scaled or placed in different locations if a delay is not satisfied, or if there is an opportunity for cost savings. The communications between the controller 320 and the network functions 330 can be via an O1 type interface, while the communications between the controller 320 and the cloud 340 can be via an O2 type interface.

At 311, the operator 310 can provide inter-cell relations data to the controller 320. The inter-cell relations data can define relationships between network functions of cells as well as delay thresholds for communications between the network functions. An example of inter-cell relations data is below in TABLE 1.

TABLE 1

| Inter-Cell Relation | Network Functions in Scope | Delay Threshold Range (milliseconds) |
|---|---|---|
| (Cell_1, Cell_2) | CU-UP | [5, 15] |
| (Cell_1, Cell_3) | DU | [0.1, 0.5] |
| (Cell_4, Cell_5) | DU | [5, 15] |
| ... | ... | ... |

At 321, the controller 320 can provide delay measurement requests to the network functions 330, e.g., to the network functions 330 identified in the inter-cell relations data 311. The controller 320 can request the network functions 330 of each cell pair indicated in the inter-cell relations data, to report measured delay, including inter-cell delay.

The remaining interactions illustrated in FIG. 3 can repeat, e.g., periodically, to enable controller 320 to make adjustments to the placement of the network functions 330 within the cloud 340, as well as to enable controller 320 to make adjustments to scaling of cloud resources applied to the network functions 330.

At 331, the network functions 330 can provide delay measurement data to the controller 320. In some embodiments, the network functions 330 can measure and report both the inter-cell delay ($T_{inter-cell}$) as well as the processing delay ($T_{proc}$) associated with each cell's network functions ($T_{proc,Cell\_x}$ and $T_{proc,Cell\_y}$). The total delay ($T_{total}$) can also be computed as $T_{total}=T_{inter-cell}+T_{proc,Cell\_x}+T_{proc,Cell\_y}$. $T_{total}$ can also be included in delay measurement data 331 reported to controller 320.

An example of delay measurement data provided by network functions 330 to the controller 320 pursuant to interaction 331 is below in TABLE 2. TABLE 2 also includes a column showing an example controller 320 output, e.g., "satisfied," "unsatisfied," or "unavailable," based on the reported delay measurement data. The controller outputs are described further in connection with FIG. 4

TABLE 2

| Inter-Cell Relation (Cell x, Cell y) | Measured Delay (milliseconds) | | | | Controller Output |
|---|---|---|---|---|---|
| | $T_{proc, Cell\_x}$ | $T_{proc, Cell\_y}$ | $T_{inter-cell}$ | $T_{total}$ | |
| (Cell_1, Cell_2) | 2 | 2 | 4 | 8 | Satisfied |
| (Cell_1, Cell_3) | 0.1 | 0.1 | 2 | 2.2 | Unsatisfied |
| (Cell_4, Cell_5) | N/A | N/A | N/A | N/A | Unavailable |
| ... | ... | ... | ... | ... | ... |

The controller 320 can conduct delay analysis 322, in order to determine whether any of the delay measurements 331 violate delay thresholds. In general, delay analysis 322 can comprise, e.g., identifying large delays in delay measurements data (delays that exceed an upper delay threshold), identifying small delays in delay measurements data (delays below a lower delay threshold), and identifying unavailable delay in delay measurements data. FIG. 4 illustrates example delay analysis 322 that can be performed by the controller 320 in some embodiments.

For delay measurements 331 that are outside delay threshold ranges, the controller 320 can perform scaling and placement determinations 323. Placement determinations can determine new cloud 340 placement locations for the network functions 330. Scaling determinations can determine cloud 340 resources to apply to network functions 330. Scaling and placement determinations 323 can result in scaling and placement decisions 324, comprising the location placement and scaling determinations generated by the processing conducted pursuant to scaling and placement determinations 323. The controller 320 can provide scaling and placement decisions 324 to the cloud 340, to thereby enable the cloud 340 to implement the scaling and placement decisions 324.

FIG. 4 is a diagram illustrating example operations that can be performed by a controller in connection with analyzing delay measurement data, in accordance with one or more embodiments described herein. In embodiments according to FIG. 4, a controller, e.g. controller 130, 200, or 320, illustrated in previous Figures, can analyze delay measurement data received from cells and/or network functions. The controller can determine whether any reported delays exceed delay threshold values. If not, the controller can allow current network function scaling and placement settings to remain the same. If delay thresholds are violated, the controller can determine new/different/updated network function scaling and placement settings and can provide the different settings to the cloud for implementation.

At 401, the controller can begin processing of delay measurement data for a cell relation i. At 402, the controller can evaluate a total delay measurement $T_{total}$ for the cell relation i. The total delay $T_{total}$ for the cell relation i can be compared against a delay threshold range $T_{req}$ for the cell relation i. In response to the total delay $T_{total}$ exceeding the delay threshold range $T_{req}$, the controller can record the delay as "unsatisfied" for the cell relation i, i.e., the $T_{total}$ is above the maximum value in the delay threshold range, and the controller can proceed to 403. Alternatively, in response to the total delay $T_{total}$ not exceeding the delay threshold range $T_{req}$, the controller can proceed to 410.

At 403, for unsatisfied delay, the controller can determine the reason for the high delay. The controller can determine whether an inter-cell component $T_{inter-cell}$ of the total delay $T_{total}$ exceeds the delay threshold range $T_{req}$ for the cell relation i. In response to the inter-cell component $T_{inter-cell}$ exceeding the delay threshold range $T_{req}$, the controller can proceed to 404. In response to the inter-cell component $T_{inter-cell}$ not exceeding the delay threshold range $T_{req}$, the controller can proceed to 405.

At change network function placement 404, if the inter-cell delay $T_{inter-cell}$ is high at 403, then the controller can recommend changing the location of a network function, e.g., by moving the network function to cloud infrastructure that has closer proximity to the other coordinating network function. For example, with reference to FIG. 1, the controller 130 can recommend changing the location of CU 107, e.g., by moving the CU 107 to cloud location 114, which has closer proximity to the coordinating CU 103.

At scale up resources 405, because the inter-cell component $T_{inter-cell}$ did exceed the delay threshold range $T_{req}$, processing delay $T_{proc}$ can be deemed to be the cause for the high delay, and so the controller can recommend allocating, by cloud infrastructure, more processing, memory, or other resources to one or more of the network functions for the cell relation i.

At operation 410, the controller can determine whether the total delay $T_{total}$ for the cell relation i is within or below the delay threshold range $T_{req}$ for the cell relation i. The controller can record the delay as "satisfied" for the cell relation i when $T_{total}$ is within the delay threshold range $T_{req}$ for the cell relation i. The controller need not make any scaling or placement recommendations for cell relations with satisfied delay.

The controller can optionally record the delay as "over-satisfied" for the cell relation i when $T_{total}$ is below the delay threshold range $T_{req}$ for the cell relation i. For over-satisfied delay, the controller can proceed to scale down resources 411, whereby the controller can recommend reducing the cloud resources allocated to a network function of cell relation i, in order to save operational costs and make more resources available for other, unsatisfied cell relations.

In response to the total delay $T_{total}$ being unavailable, the operations 402-405 and 410-411 can be inapplicable, and the controller can move to operation 420. At 420, the controller can record the delay as "unavailable" for the cell relation i, meaning $T_{total}$ was not calculated due to the unavailability of one or more delay components. For unavailable delay, the controller can request delay measurements 421 from network functions, e.g., by resending measurement requests. If the delay remains unavailable after several retries, then the relation can be deemed to be unavailable, and the controller can optionally generate an alarm to the operator/vendor for further troubleshooting actions.

After the evaluation and optimization operations according to FIG. 4, the controller can communicate the decisions to network functions and to cloud infrastructure. The cloud can communicate further with network functions in accordance with controller recommendations, in order to relocate and or scale resources applied to network functions.

Figure 5:
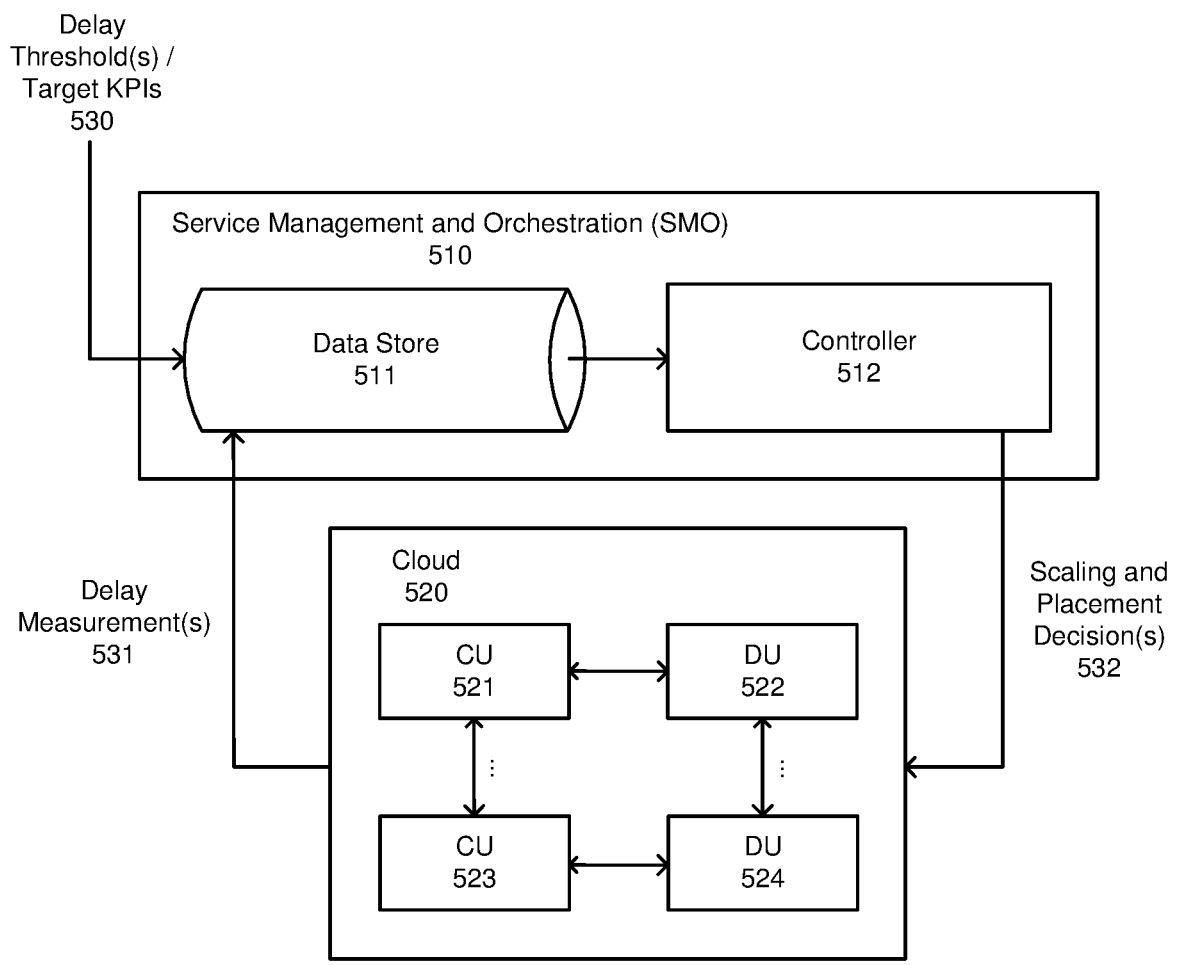
FIG. 5 is a diagram illustrating interactions between a service management and orchestration (SMO) layer comprising a controller such as described herein, and a cloud comprising different network functions at different locations, in accordance with one or more embodiments described herein.

FIG. 5 is a diagram illustrating interactions between a service management and orchestration (SMO) layer comprising a controller such as described herein, and a cloud comprising different network functions at different locations, in accordance with one or more embodiments described herein. FIG. 5 includes SMO 510 and cloud 520. The SMO comprises data store 511 and controller 512. The cloud 520 comprises CU 521, DU 522, CU 523, and DU 524.

In FIG. 5, the controller 512 can implement, e.g., the controller 130, 200, or 320 illustrated in previous Figures. The cloud 520 can implement, e.g. the RAN 100 or the cloud 340 illustrated in previous Figures. The CU 521, DU 522, CU 523, and DU 524 can implement, e.g. the CUs and DUs illustrated in FIG. 1 or the NFs 330 illustrated in FIG. 3.

Example operations according to FIG. 5 can include, e.g., storing, by a network operator, delay thresholds and target key performance indicators (KPIs) 530 in the data store 511. Furthermore, delay measurements 531 can be obtained from the cloud 520, and the delay measurements 531 can also be stored in the data store 511. Delay measurements 531 can comprise measured delays associated with the CU 521, DU 522, CU 523, and DU 524, including inter-cell delay associated with communications between CU 521, DU 522, CU 523, and DU 524. Intra-cell delay measurements can also optionally be included in delay measurements 531.

The controller 512 can compare the delay measurements 531 to delay thresholds and target KPIs 530. For network functions (CU 521, DU 522, CU 523, or DU 524) associated with delay measurements 531 that exceed delay thresholds and target KPIs 530, the controller 512 can determine scaling and placement decisions 532, comprising different network function placement locations within the cloud 520, or adjustments of cloud 520 resources applied to a network function. The controller 512 can send the scaling and placement decisions 532 to the cloud 520 for implementation.

Figure 6:
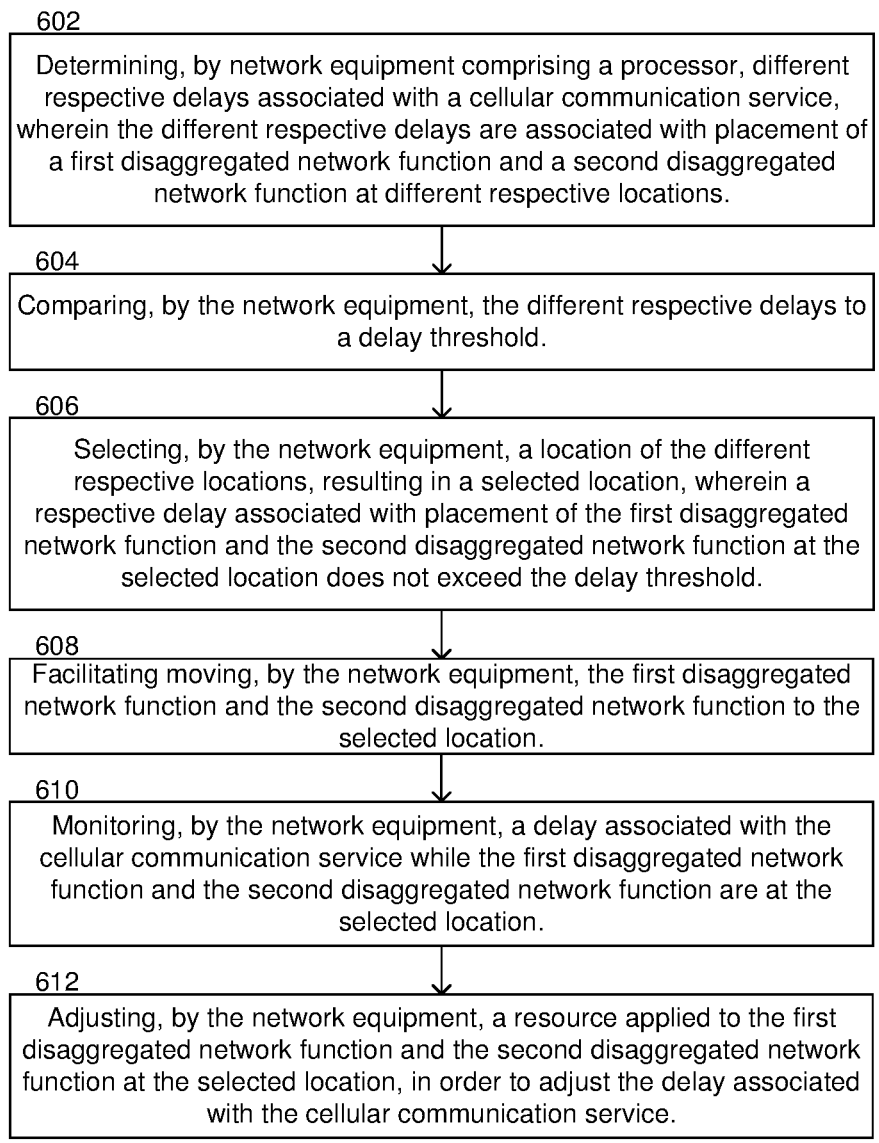
FIG. 6 is a flow diagram of a first example, non-limiting computer implemented method for determining network function placement, in accordance with one or more embodiments described herein.

FIG. 6 is a flow diagram of a first example, non-limiting computer implemented method for determining network function placement, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 6 can be performed by network equipment comprising a controller 130 such as illustrated in FIG. 1. Operation 602 comprises determining, by network equipment 130 comprising a processor, different respective delays associated with a cellular communication service, i.e., cellular communication service provided by the RAN 100, wherein the different respective delays are associated with placement of a first disaggregated network function, e.g., CU 103 and a second disaggregated network function, e.g., CU 107, at different respective locations, e.g., at locations 111, 112, 113, 114, and 115.

In an example, the first disaggregated network function can comprise a first CU 103 or a first DU 102 that is communicatively coupled with a first cell 101 of a cellular communication network. The second disaggregated network function can comprise a second CU 107 or a second DU 106 communicatively coupled with a second cell 105 of the cellular communication network. The first cell 101 and the second cell 105 can be configured to simultaneously provide cellular communication service to a user equipment 121, e.g., in a dual connectivity arrangement.

Operation 604 comprises comparing, by the network equipment 130, the different respective delays, i.e. the delays determined at operation 602, to a delay threshold, e.g. a delay threshold of delay thresholds 131. Delay thresholds 131 can be configured by a network operator and can optionally be based on service type. In some embodiments, the delay threshold can comprise, e.g., an inter-cell delay threshold for communication between the first disaggregated network function, e.g., CU 103, and the second disaggregated network function, e.g., CU 107. In some embodiments, the delay threshold can be associated with communication between a first cell 101 and the first disaggregated network function, e.g., CU 103, or the delay threshold can be associated with communication between a second cell 105 and the second disaggregated network function, e.g., CU 107.

Operation 606 comprises selecting, by the network equipment 130, a location, e.g., location 114, of the different respective locations 111, 112, 113, 114, and 115, resulting in a selected location 114, wherein a respective delay associated with placement of the first disaggregated network function, e.g., CU 103, and the second disaggregated network function, e.g., CU 107, at the selected location 114 does not exceed the delay threshold 131.

In some embodiments, selecting a location 114 at operation 606 can comprise selecting location(s) leading to a lower or lowest delay, so that for example, the respective delay associated with placement of the first disaggregated network function 103 and the second disaggregated network function 107 at the selected location 114 is lower than another respective delay associated with placement of the first disaggregated network function 103 and the second disaggregated network function 107 at another respective location of the different respective locations, e.g., at location 113.

In some embodiments, selecting a location 114 at operation 606 can comprise comparing different respective disaggregated network function pooling gains associated with the different respective locations 111, 112, 113, 114, and 115. The selected location can have a higher or highest disaggregated network function pooling gain, e.g., a pooling gain that is higher than at least one other location of the different respective locations, e.g., higher than a pooling gain at location 115.

In some embodiments, the selected location of the different respective locations 111, 112, 113, 114, and 115 can comprise multiple locations, e.g., a first location 111 for placement of the first disaggregated network function 103 and a second location 114 for placement of the second disaggregated network function 107.

Operation 608 comprises facilitating moving, by the network equipment 130, the first disaggregated network function 103 and the second disaggregated network function 107 to the selected location 114. When multiple locations 111, 114 are selected for the network functions 103, 107, the network functions 103, 107 can be moved to the multiple locations 111, 114, or one of the network functions 107 can be moved, e.g., to the selected location 114, while another network function 111 remains in place. Moving network functions 103, 107 to different locations can be facilitated by, e.g., providing network function placement recommendations among the scaling and network function move determinations 142 to a RAN 100 or to a cloud that hosts RAN 100 network functions.

Operation 610 comprises monitoring, by the network equipment 130, a delay associated with the cellular communication service while the first disaggregated network function 103 and the second disaggregated network function 114 are at the selected location 114. After the network function(s) 103, 107 are moved to different location(s), delay monitoring can continue to monitor performance/delay associated with the network function(s) 103, 107. For example, the controller 130 can continue to request delay measurements 141 and the controller 130 can compare returned delay measurements 141 to delay thresholds 131.

Operation 612 comprises adjusting, by the network equipment 130, a resource applied to the first disaggregated network function 103 and the second disaggregated network function 107 at the selected location 114, in order to adjust the delay associated with the cellular communication service. For example, scaling determinations among scaling and network function move determinations 142 can facilitate adjustment of resources available for a network function 107 at a cloud location 114.

Figure 7:
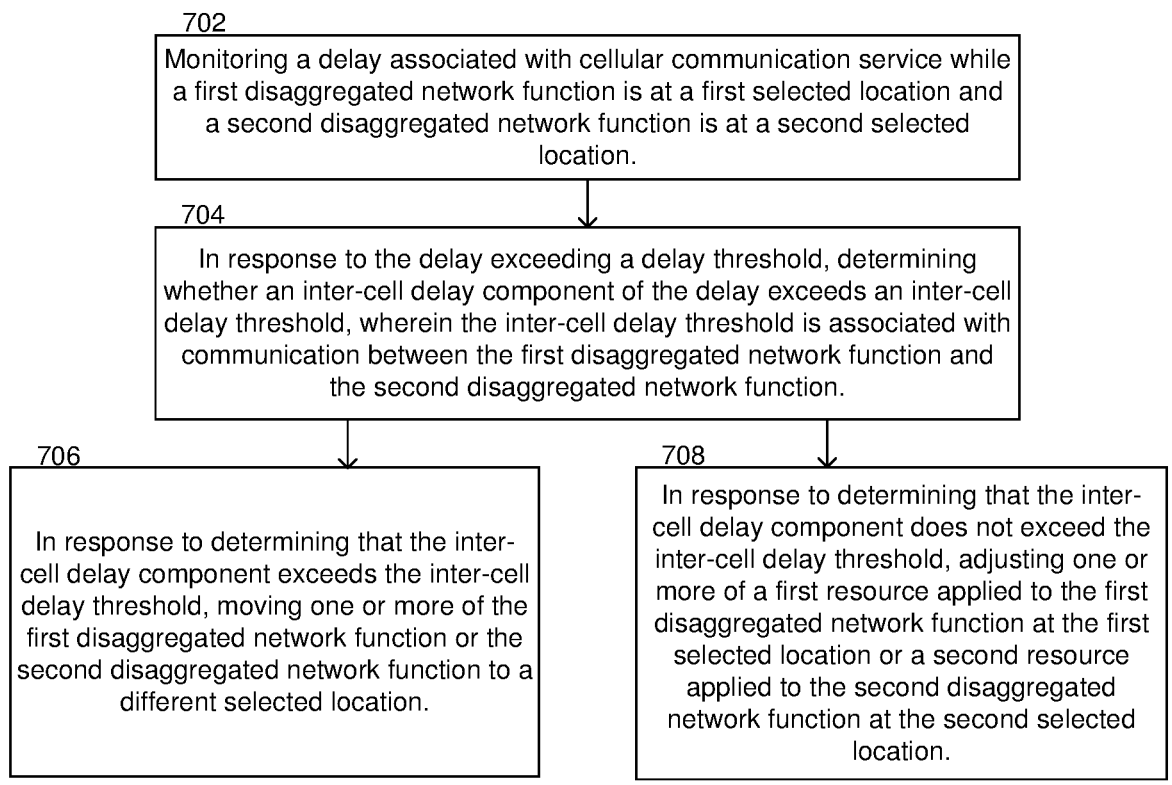
FIG. 7 is a flow diagram of a second example, non-limiting computer implemented method for determining network function placement, in accordance with one or more embodiments described herein.

FIG. 7 is a flow diagram of a second example, non-limiting computer implemented method for determining network function placement, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 7 can be performed by network equipment comprising a controller 130 such as illustrated in FIG. 1. Operation 702 comprises monitoring a delay associated with cellular communication service, e.g., the service provided by RAN 100, while a first disaggregated network function, e.g., CU 103 or DU 102, is at a first selected location such as 111 or 112 and a second disaggregated network function, e.g., CU 107 or DU 106, is at a second selected location such as 113 or 115. Delay can be monitored by receiving delay measurements 141.

The first disaggregated network function can comprise one or more of a first central unit 103 and a first distributed unit 102, and the second disaggregated network function can comprise one or more of a second central unit 107 and a second distributed unit 106. The first disaggregated network function can be communicatively coupled with a first cell 101 of a cellular communication network 100, and the second disaggregated network function can be communicatively coupled with a second cell 105 of the cellular communication network 100. The first cell 101 and the second cell 105 can be configured to provide the cellular communication service to a user equipment 121.

Operation 704 comprises, in response to the delay exceeding a delay threshold 131, determining whether an inter-cell delay component of the delay exceeds an inter-cell delay threshold, wherein the inter-cell delay threshold is associated with communication between the first disaggregated network function, e.g., CU 103, and the second disaggregated network function, e.g., CU 107. Operation 704 can be followed by operation 706 in response to determining, at operation 704, that the inter-cell delay component exceeds the inter-cell delay threshold. Alternatively, operation 704 can be followed by operation 708 in response to determining, at operation 704, that the inter-cell delay component does not exceed the inter-cell delay threshold.

Operation 706 comprises, in response to determining that the inter-cell delay component exceeds the inter-cell delay threshold, moving one or more of the first disaggregated network function, e.g., CU 103, or the second disaggregated network function, e.g., CU 107, to a different selected location, e.g., to location 114. Moving a disaggregated network function to the different selected location 114 can comprise determining different respective delays associated with the cellular communication service, e.g., by estimating delays associated with different locations 111, 112, 113, 114, and 115, wherein the different respective delays are associated with placement of one or more of the first disaggregated network function 103 or the second disaggregated network function 107 at the different respective locations 111, 112, 113, 114, and 115. Moving one or more of the first disaggregated network function 103 or the second disaggregated network function 107 to the different selected location 114 can comprise selecting the different location 114 from among the different respective locations 111, 112, 113, 114, and 115.

Operation 708 comprises, in response to determining that the inter-cell delay component does not exceed the inter-cell delay threshold, adjusting one or more of a first resource applied to the first disaggregated network function, e.g., CU 103, at the first selected location, e.g., at location 111, or a second resource applied to the second disaggregated network function, e.g., CU 107, at the second selected location, e.g., at location 113.

Figure 8:
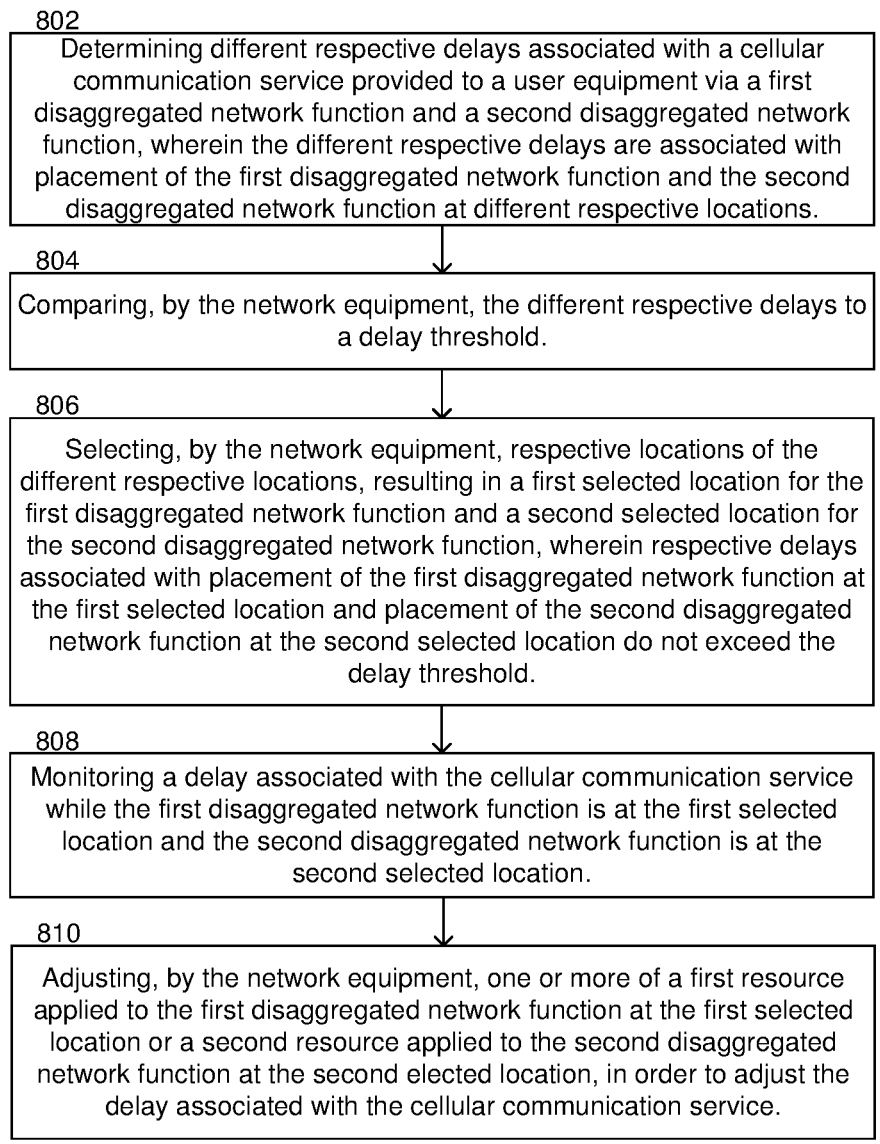
FIG. 8 is a flow diagram of a third example, non-limiting computer implemented method for determining network function placement, in accordance with one or more embodiments described herein.

FIG. 8 is a flow diagram of a third example, non-limiting computer implemented method for determining network function placement, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 8 can be performed by network equipment comprising a controller 130 such as illustrated in FIG. 1. Operation 802 comprises determining different respective delays associated with a cellular communication service provided to a user equipment 121 via a first disaggregated network function, e.g., via CU 103 and a second disaggregated network function, e.g., via CU 107, wherein the different respective delays are associated with placement of the first disaggregated network function 103 and the second disaggregated network function 107 at different respective locations, e.g., at locations 111, 112, 113, 114, and 115. The determining of different respective delays can comprise estimating delays that would result from placing network functions such as 103 and 107 at the different respective locations 111, 112, 113, 114, and 115.

In an embodiment, the first disaggregated network function 103 can comprise, e.g., a first CU 103 communicatively coupled with a first cell 101 of a cellular communication network 100. The second disaggregated network function 107 can comprise a second CU 107 communicatively coupled with a second cell 105 of the cellular communication network 100. Alternatively, the first disaggregated network function can comprise, e.g., a first DU 102 and the second disaggregated network function can comprise a second DU 106. The first cell 101 and the second cell 105 can provide the cellular communication service to the user equipment 121 simultaneously in order to provide a dual connectivity connection.

Operation 804 comprises comparing, by the network equipment 130, the different respective delays, e.g., the delays determined at operation 802, to a delay threshold, e.g., a delay threshold of delay thresholds 131. Operation 806 comprises selecting, by the network equipment 130, respective locations, e.g., locations 111 and 114 of the different respective locations 111, 112, 113, 114, and 115, resulting in a first selected location 111 for the first disaggregated network function 103 and a second selected location 114 for the second disaggregated network function 107, wherein respective delays associated with placement of the first disaggregated network function 103 at the first selected location 111 and placement of the second disaggregated network function 103 at the second selected location 114 do not exceed the delay threshold, e.g., the threshold from delay thresholds 131. The selected locations 111 and 114 can be recommended for placement of the network functions 103, 107, thereby facilitating moving the network functions 103, 107 to the selected locations 111 and 114.

Operation 808 comprises monitoring a delay associated with the cellular communication service while the first disaggregated network function 103 is at the first selected location 111 and the second disaggregated network function 107 is at the second selected location 114. For example, the controller 130 can monitor delay measurements 141. Operation 810 comprises adjusting, by the network equipment 130, one or more of a first resource applied to the first disaggregated network function 103 at the first selected location 111 or a second resource applied to the second disaggregated network function 107 at the second elected location 114, in order to adjust the delay associated with the cellular communication service. For example, scaling and network function placement determinations 142 can comprise scaling instructions for scaling resources at location 111 and location 114.

Figure 9:
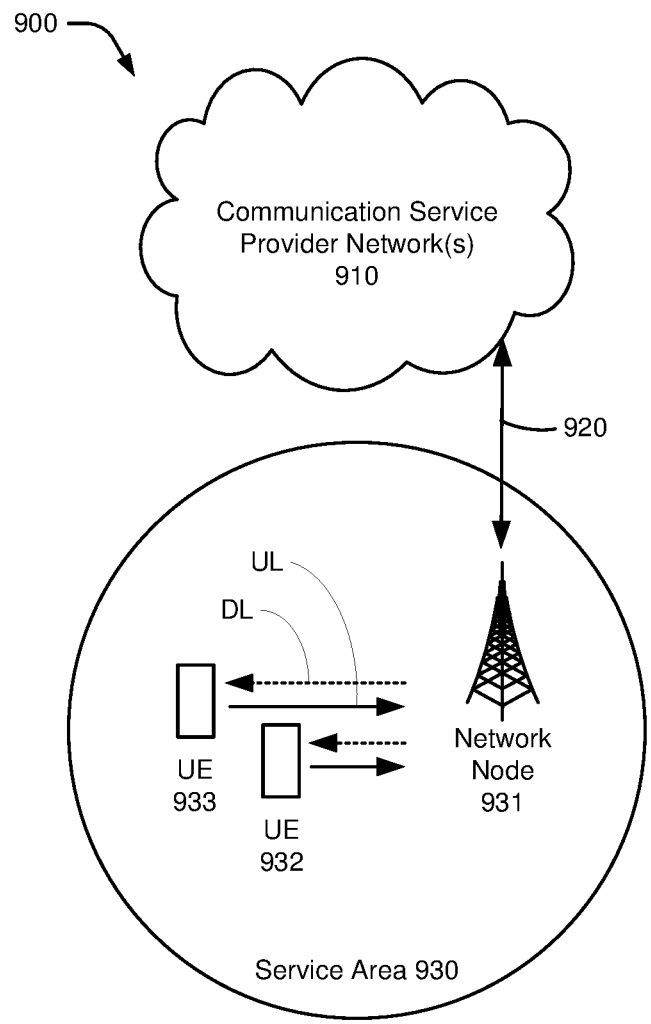
FIG. 9 illustrates an example wireless communication system, in accordance with one or more embodiments described herein.

FIG. 9 illustrates an example wireless communication system 900, in accordance with one or more embodiments described herein. The example wireless communication system 900 comprises communication service provider network(s) 910, a network node 931, and user equipment (UEs) 932, 933. A backhaul link 920 connects the communication service provider network(s) 910 and the network node 931. The network node 931 can communicate with UEs 932, 933 within its service area 930. The dashed arrow lines from the network node 931 to the UEs 932, 933 represent downlink (DL) communications to the UEs 932, 933. The solid arrow lines from the UEs 932, 933 to the network node 931 represent uplink (UL) communications.

In general, with reference to FIG. 9, the non-limiting term "user equipment" can refer to any type of device that can communicate with network node 931 in a cellular or mobile communication system 900. UEs 932, 933 can have one or more antenna panels having vertical and horizontal elements. Examples of UEs 932, 933 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 932, 933 can also comprise IOT devices that communicate wirelessly.

In various embodiments, system 900 comprises communication service provider network(s) 910 serviced by one or more wireless communication network providers. Communication service provider network(s) 910 can comprise a "core network". In example embodiments, UEs 932, 933 can be communicatively coupled to the communication service provider network(s) 910 via a network node 931. The network node 931 can communicate with UEs 932, 933, thus providing connectivity between the UEs 932, 933 and the wider cellular network. The UEs 932, 933 can send transmission type recommendation data to the network node 931. The transmission type recommendation data can comprise a recommendation to transmit data via a closed loop multiple input multiple output (MIMO) mode and/or a rank-1 precoder mode.

Network node 931 can have a cabinet and other protected enclosures, computing devices, an antenna mast, and multiple antennas for performing various transmission operations (e.g., MIMO operations) and for directing/steering signal beams. Network node 931 can comprise one or more base station devices which implement features of the network node. Network nodes can serve several cells, depending on the configuration and type of antenna. In example embodiments, UEs 932, 933 can send and/or receive communication data via wireless links to the network node 931.

Communication service provider networks 910 can facilitate providing wireless communication services to UEs 932, 933 via the network node 931 and/or various additional network devices (not shown) included in the one or more communication service provider networks 910. The one or more communication service provider networks 910 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 900 can be or comprise a large-scale wireless communication network that spans various geographic areas. According to this implementation, the one or more communication service provider networks 910 can be or comprise the wireless communication network and/or various additional devices and components of the wireless communication network (e.g., additional network devices and cell, additional UEs, network server devices, etc.).

The network node 931 can be connected to the one or more communication service provider networks 910 via one or more backhaul links 920. The one or more backhaul links 920 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 920 can also comprise wireless link components, such as but not limited to, line-of-sight (LOS) or non-LOS links which can comprise terrestrial air-interfaces or deep space links (e.g., satellite communication links for navigation). Backhaul links 920 can be implemented via a "transport network" in some embodiments. In another embodiment, network node 931 can be part of an integrated access and backhaul network. This may allow easier deployment of a dense network of self-backhauled 5G cells in a more integrated manner by building upon many of the control and data channels/procedures defined for providing access to UEs 932, 933.

Wireless communication system 900 can employ various cellular systems, technologies, and modulation modes to facilitate wireless radio communications between devices (e.g., the UEs 932, 933 and the network node 931). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 900 can operate in accordance with any 5G, next generation communication technology, or existing communication technologies, various examples of which are listed supra. In this regard, various features and functionalities of system 900 are applicable where the devices (e.g., the UEs 932, 933 and the network node 931) of system 900 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 900 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 9 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 10:
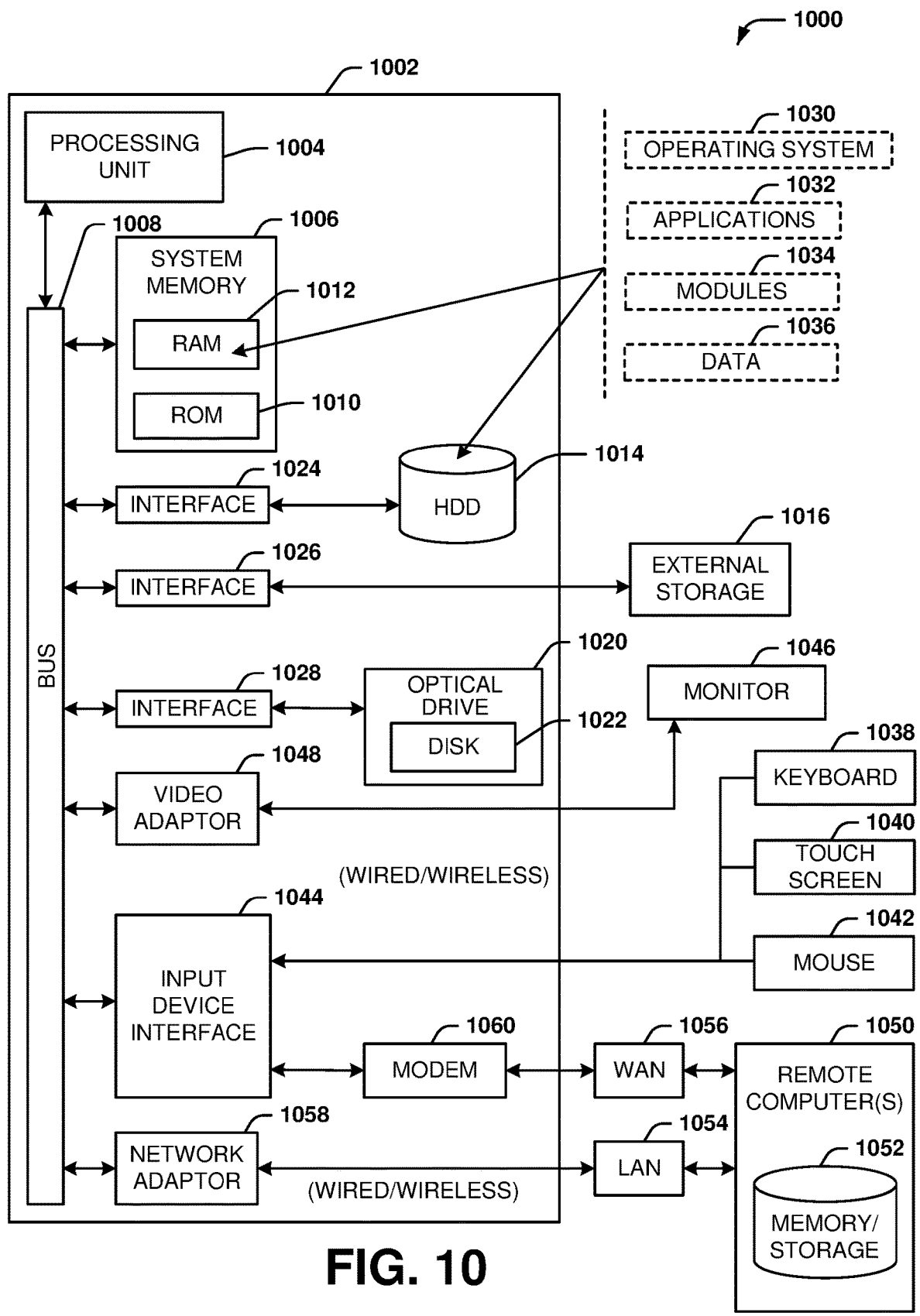
FIG. 10 illustrates a block diagram of an example computer operable to provide any of the various devices described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by network equipment comprising at least one processor, different respective delays associated with a cellular communication service, wherein the different respective delays are associated with placement of a first disaggregated network function and a second disaggregated network function at different respective locations;
   comparing, by the network equipment, the different respective delays to a delay threshold;
   selecting, by the network equipment, a location of the different respective locations, resulting in a selected location, wherein a respective delay associated with placement of the first disaggregated network function and the second disaggregated network function at the selected location does not exceed the delay threshold;
   moving, by the network equipment, the first disaggregated network function and the second disaggregated network function to the selected location; and
   monitoring, by the network equipment, a delay associated with the cellular communication service while the first disaggregated network function and the second disaggregated network function are at the selected location.

2. The method of claim 1, wherein:
the first disaggregated network function is communicatively coupled with a first cell of a cellular communication network,
the second disaggregated network function is communicatively coupled with a second cell of the cellular communication network, and
the first cell and the second cell are configured to simultaneously provide cellular communication service to a user equipment.

3. The method of claim 1, further comprising adjusting, by the network equipment, a resource applied to the first disaggregated network function and the second disaggregated network function at the selected location, in order to adjust the delay associated with the cellular communication service.

4. The method of claim 1, wherein selecting the location of the different respective locations comprises comparing different respective disaggregated network function pooling gains associated with the different respective locations, and wherein the selected location has a higher disaggregated network function pooling gain than at least one other location of the different respective locations.

5. The method of claim 1, wherein the delay threshold comprises an inter-cell delay threshold for communication between the first disaggregated network function and the second disaggregated network function.

6. The method of claim 1, wherein:
the delay threshold is associated with first communication between a first cell and the first disaggregated network function; or
the delay threshold is associated with second communication between a second cell and the second disaggregated network function.

7. The method of claim 1, wherein the first disaggregated network function comprises a first central unit, and wherein the second disaggregated network function comprises a second central unit.

8. The method of claim 1, wherein the location of the different respective locations comprises multiple locations, including a first location for placement of the first disaggregated network function and a second location for placement of the second disaggregated network function.

9. The method of claim 1, wherein the respective delay associated with placement of the first disaggregated network function and the second disaggregated network function at the selected location is lower than another respective delay associated with placement of the first disaggregated network function and the second disaggregated network function at another respective location of the different respective locations.

10. Network equipment, comprising:
a processor; and
a memory that stores executable instructions that, when executed by the processor, facilitate performance of operations, comprising:
monitoring a delay associated with cellular communication service while a first disaggregated network function is at a first selected location and a second disaggregated network function is at a second selected location;
in response to the delay exceeding a delay threshold, determining whether an inter-cell delay component of the delay exceeds an inter-cell delay threshold, wherein the inter-cell delay threshold is associated with communication between the first disaggregated network function and the second disaggregated network function; and
in response to determining that the inter-cell delay component exceeds the inter-cell delay threshold, moving one or more of the first disaggregated network function or the second disaggregated network function to a different selected location; or
in response to determining that the inter-cell delay component does not exceed the inter-cell delay threshold, adjusting one or more of a first resource applied to the first disaggregated network function at the first selected location or a second resource applied to the second disaggregated network function at the second selected location.

11. The network equipment of claim 10, wherein:
the first disaggregated network function is communicatively coupled with a first cell of a cellular communication network,
the second disaggregated network function is communicatively coupled with a second cell of the cellular communication network, and
the first cell and the second cell are configured to provide the cellular communication service to a user equipment.

12. The network equipment of claim 10, wherein moving one or more of the first disaggregated network function or the second disaggregated network function to the different selected location comprises determining different respective delays associated with the cellular communication service, wherein the different respective delays are associated with placement of one or more of the first disaggregated network function or the second disaggregated network function at different respective locations.

13. The network equipment of claim 12, wherein moving one or more of the first disaggregated network function or the second disaggregated network function to the different selected location further comprises selecting the different location from among the different respective locations.

14. The network equipment of claim 10, wherein the first disaggregated network function comprises one or more of a first central unit and a first distributed unit, and wherein the second disaggregated network function comprises one or more of a second central unit and a second distributed unit.

15. A non-transitory machine-readable medium, comprising executable instructions that, when executed by at least one processor, facilitate performance of operations, comprising:
determining different respective delays associated with a cellular communication service provided to a user equipment via a first disaggregated network function and a second disaggregated network function, wherein the different respective delays are associated with placement of the first disaggregated network function and the second disaggregated network function at different respective locations;
comparing, by the network equipment, the different respective delays to a delay threshold;
selecting, by the network equipment, respective locations of the different respective locations, resulting in a first selected location for the first disaggregated network function and a second selected location for the second disaggregated network function, wherein respective delays associated with placement of the first disaggregated network function at the first selected location and placement of the second disaggregated network function at the second selected location do not exceed the delay threshold; and monitoring, by the network equipment, a delay associated with the cellular communication service while the first disaggregated network function is at the first selected location and the second disaggregated network function is at the second selected location.

16. The non-transitory machine-readable medium of claim 15, wherein:

the first disaggregated network function comprises a first central unit communicatively coupled with a first cell of a cellular communication network, the second disaggregated network function comprises a second central unit communicatively coupled with a second cell of the cellular communication network, and the first cell and the second cell provide the cellular communication service to the user equipment simultaneously in order to provide a dual connectivity connection.

17. The non-transitory machine-readable medium of claim 15, wherein the operations further comprise:

adjusting, by the network equipment, one or more of a first resource applied to the first disaggregated network function at the first selected location or a second resource applied to the second disaggregated network function at the second elected location, in order to adjust the delay associated with the cellular communication service.

18. The non-transitory machine-readable medium of claim 15, wherein the delay threshold comprises an inter-cell delay threshold for communication between the first disaggregated network function and the second disaggregated network function.

19. The non-transitory machine-readable medium of claim 15, wherein:

the delay threshold is associated with first communication between a first cell and the first disaggregated network function; or the delay threshold is associated with second communication between a second cell and the second disaggregated network function.

20. The non-transitory machine-readable medium of claim 15, wherein the first disaggregated network function comprises one or more of a first central unit and a first distributed unit, and wherein the second disaggregated network function comprises one or more of a second central unit and a second distributed unit.

* * * * *